United States Patent
Xiang et al.

(10) Patent No.: US 12,494,252 B2
(45) Date of Patent: Dec. 9, 2025

(54) MEMORY WITH SEPARATE DRIVERS FOR WORD LINES AND SELECT GATES

(71) Applicant: Yangtze Memory Technologies Co., LTD., Hubei (CN)

(72) Inventors: Li Xiang, Hubei (CN); Wei Huang, Hubei (CN); Chunyuan Hou, Hubei (CN)

(73) Assignee: Yangtze Memory Technologies Co., LTD., Wuhan (CN)

( * ) Notice: Subject to any disclaimer, the term of this patent is extended or adjusted under 35 U.S.C. 154(b) by 161 days.

(21) Appl. No.: 18/323,921

(22) Filed: May 25, 2023

(65) Prior Publication Data
US 2024/0290388 A1    Aug. 29, 2024

(30) Foreign Application Priority Data
Feb. 24, 2023   (CN) .......................... 202310180880.4

(51) Int. Cl.
*G11C 16/08*    (2006.01)

(52) U.S. Cl.
CPC .................... *G11C 16/08* (2013.01)

(58) Field of Classification Search
CPC ..... G11C 16/08; G11C 16/0483; G11C 16/10; G11C 16/26; G11C 16/30; G11C 29/42
See application file for complete search history.

(56) References Cited

U.S. PATENT DOCUMENTS

2001/0005015 A1* 6/2001 Futatsuyama .......... G11C 16/08
                                                                365/185.17
2006/0186942 A1* 8/2006 Futatsuyama .......... G11C 16/08
                                                                365/189.11

OTHER PUBLICATIONS

Zabeli, Milaim & Caka, Nebi & Limani, Myzafere & Kabashi, Qamil. (2014). Role of the threshold voltage and transconductance parameters of NMOS transistors in NMOS inverter performance for static and switching conditions of operation. WSEAS Transactions on Circuits and Systems. 13. 1-10. (Year: 2014).*
Zabeli, et al ("Role of the threshold voltage and transconductance parameters of NMOS transistors in NMOS inverter performance for static and switching conditions of operation," WSEAS Transactions on Circuits and Systems, 2014), (Year: 2104).*

* cited by examiner

*Primary Examiner* — Amir Zarabian
*Assistant Examiner* — Bradley S Coon
(74) *Attorney, Agent, or Firm* — Hanley, Flight & Zimmerman, LLC

(57) ABSTRACT

Examples of the present application disclose a memory, a storage system and an electronic product. The memory comprises a control circuit, a voltage loading circuit, a first driver, and a second driver. The voltage loading circuit, in response to a block selection signal received by a control terminal, is configured to load a first voltage to a control terminal of the first driver through a first output terminal, and load a second voltage to a control terminal of the second driver through a second output terminal. Because starting voltages may be loaded by different output terminals, all the drivers do not share the same starting voltage any longer, and performance degradation caused by a tunneling effect is avoided. Therefore, based on the memory provided by the examples of the present application, the performance degradation of various drivers can be improved.

15 Claims, 9 Drawing Sheets

MEMORY WITH SEPARATE DRIVERS FOR WORD LINES AND SELECT GATES

CROSS-REFERENCE TO RELATED APPLICATION

This application claims priority to and the benefit of Chinese Patent Application 202310180880.4, filed on Feb. 24, 2023, which is hereby incorporated by reference in its entirety.

TECHNICAL FIELD

The present application relates to storage and, in particular, to memories, storage systems, and electronic products.

BACKGROUND

When operations such as programming or reading, are performed on a three-dimensional memory, these operations facilitate selection of some memory cells in a block and then perform the operations such as programming or reading on these memory cells. To enable selection of some memory cells in a block, the memory cells are configured with a voltage loading circuit and a driver for the block, where the voltage loading circuit starts the driver to load respective voltages to word lines (WLs), top select gates (TSGs) and bottom select gates (BSGs) of the block through the driver, thereby selecting some memory cells in the block.

BRIEF DESCRIPTION OF THE DRAWINGS

The drawings used to facilitate description of examples will be briefly introduced below for the purpose of illustrating the technical solutions in the examples of the present application more clearly. The drawings described below show only some examples of the present application. Those of ordinary skill in the art may obtain other examples according to these drawings without creative work.

DETAILED DESCRIPTION

To make the purposes, technical solutions and advantages of examples of the present application clearer, example implementations of the present application will be further described below in detail in conjunction with the drawings.

Figure 1:
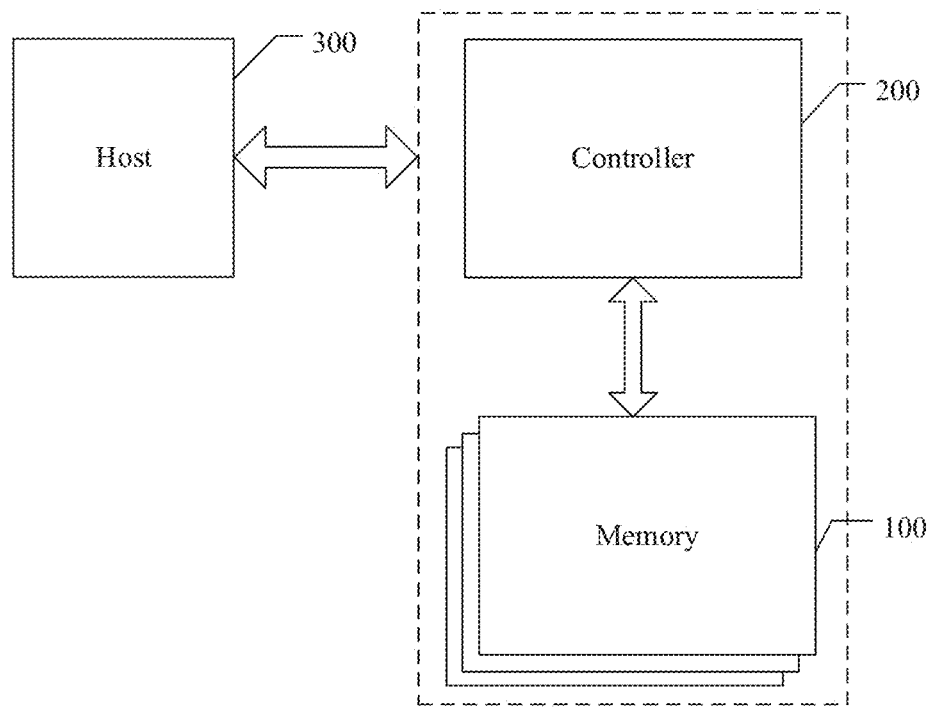
FIG. 1 is a schematic diagram of a storage system provided by examples of the present application.

FIG. 1 is a schematic diagram of a storage system 10 provided by examples of the present application. As shown in FIG. 1, the storage system 10 comprises one or more memories 100, and a controller 200 coupled to the memories 100 and configured to control the memories 100.

The controller 200 may be configured to control operations performed by the memories 100, such as read, erase and program operations. The controller 200 may be further configured to manage various functions with respect to data stored or to be stored in the memories 100, including, but not limited to bad-block management, garbage collection, logical-to-physical address conversion, wear leveling, etc. Optionally, the controller 200 may be further configured to process Error Correction Codes (ECCs) with respect to the data read from or written to the memories 100. The controller 200 may also perform any other suitable functions, such as formatting the memories 100.

The controller 200 may also communicate with an external apparatus according to a communication protocol. For example, the controller 200 may communicate with an external apparatus through at least one of various interface protocols. In some examples, the interface protocols may be a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Development Environment (IDE) protocol, a Fire Wire protocol, etc.

In some examples, the controller 200, and one or more memories 100 may be integrated in various types of electronic apparatuses. The electronic apparatuses may be a mobile phone, a desktop computer, a laptop computer, a tablet, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memories therein. In this scenario, as shown in FIG. 1, the storage system 10 further comprises a host 300. The controller 200 is coupled to the host 300. The controller 200 can manage the data stored in the memories 100 and communicate with the host 300 to achieve functions of the aforementioned electronic apparatuses.

In some other examples, the controller 200, and one or more memories 100 may be integrated in various types of memory apparatuses.

Figure 2:
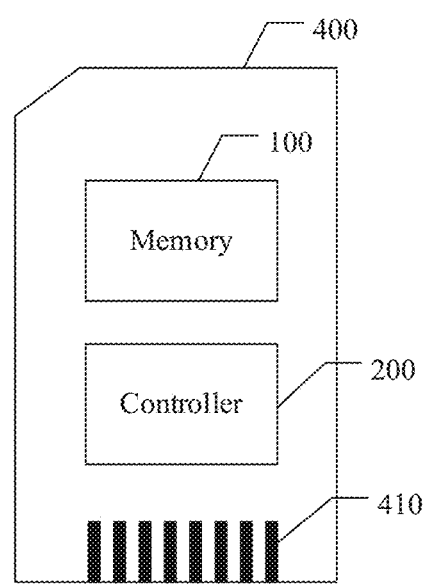
FIG. 2 is a schematic diagram of a memory card provided by examples of the present application.

As an example, as shown in FIG. 2, the controller 200 and the individual memory 100 may be integrated into a memory card 400. The memory card 400 may include a Personal Computer Memory Card International Association (PCM-CIA, PC) card, a compact flash (CF) card, a smart media (SM) card, a memory stick, a multi-media card (MMC), a reduced size MMC (RS-MMC) card, a micro-MMC card, a secure digital (SD) card, a universal flash storage (UFS) card, etc. As shown in FIG. 2, the memory card 400 may also comprise a connector 410 coupling the memory card 400 with the host.

Figure 3:
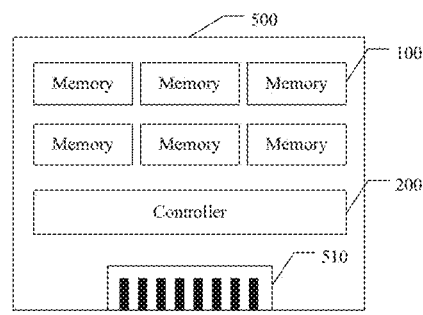
FIG. 3 is a schematic diagram of another memory card provided by examples of the present application.

As another example, as shown in FIG. 3, the controller 200 and multiple memories 100 may be integrated into a solid state drive (SSD) 500. The solid state drive 500 may also comprise a connector 510 coupling the solid state drive 500 with the host, with a storage capacity and/or a operation speed of the solid state drive 500 that are greater than those of the memory card 400.

In addition, the memories 100 in FIG. 1 to FIG. 3 may be any memory involved in the examples of the present application. For example, they may be 3D NAND memories. Structures of the memories 100 are explained and illustrated below.

Figure 4:
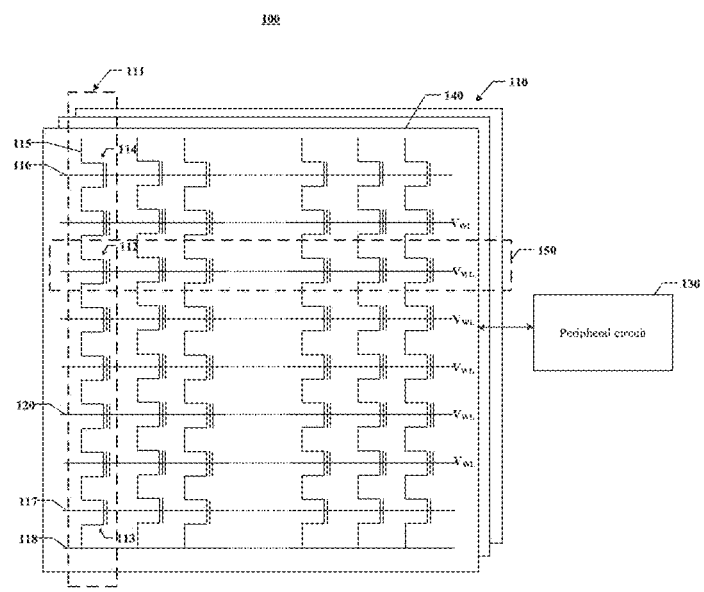
FIG. 4 is a schematic diagram of another memory card provided by examples of the present application.

FIG. 4 is a schematic diagram of a memory 100 provided by examples of the present application. As shown in FIG. 4, the memory 100 comprises: a memory array 110 including a plurality of rows of memory cells; a plurality of word lines 120 coupled to the plurality of rows of memory cells respectively; and a peripheral circuit 130 coupled to the plurality of word lines 120 and configured to perform verify operation or program operation on selected rows of memory cells of the plurality rows of memory cells, where the selected rows of memory cells are rows of memory cells to which selected word lines are coupled.

The memory array 110 may be a NAND flash memory array. As shown in FIG. 4, the NAND flash memory array comprises a plurality of memory strings 111 which are distributed in array on a substrate and each of which extends vertically above the substrate (not shown). In some examples, each memory string 111 comprises a plurality of memory cells 112 coupled in series and stacked vertically.

As shown in FIG. 4, each memory string 111 may further comprise a source select gate (SSG) 113 at the bottom and a drain select gate (DSG) 114 at the top. The source select gate is also called a lower select transistor, a bottom select gate (BSG) or a source select transistor, and the drain select gate is also called an upper select transistor, a top select gate (TSG) or a drain select transistor. The source select gate 113 and the drain select gate 114 may be configured to activate the selected memory strings 111 during read and program operations.

In some examples, the drain select gate 114 of each memory string 111 is coupled to a respective bit line 115 which the data can be read from or written into via an output bus (not shown).

In some examples, each memory string 111 is configured to apply a select voltage (e.g., higher than a threshold voltage of a transistor with the drain select gate 114) or an unselect voltage (e.g., 0V) to the respective drain select gate 114 through one or more DSG lines 116. And/or, in some examples, each memory string 111 is configured to be selected or unselected by applying a select voltage (e.g., higher than a threshold voltage of a transistor with the source select gate 113) or an unselect voltage (e.g., 0V) to the respective source select gate 113 through one or more SSG lines 117.

As shown in FIG. 4, the memory strings 111 may be organized into a plurality of blocks 140. For any one of the plurality of blocks 140, the block 140 may have a source line (SL) 118, and sources of all the memory strings 111 in the block 140 are coupled through the source line 118 that is also referred to as a common source line or an array common source (ACS).

It is to be noted that, the source line 118 is used to be grounded to achieve grounding of sources of various memory cells of the memory strings of the block 140 in some subsequent operations.

Each block 140 is the basic data unit for erase operations, i.e., all the memory cells 112 on the same block 140 are erased at the same time. To erase the memory cells 112 in a selected block, the source line coupled to the selected block can be biased with an erase voltage (Vers), such as a high positive voltage (20V or more).

It is to be understood that in some other examples, an erase operation may be performed at a half-block level, a quarter-block level, or a level having any suitable number of blocks or any suitable fractions of a block.

As shown in FIG. 4, the same layer of memory cells 112 of adjacent memory strings 111 in the same block 140 can be coupled through word lines 120 that select which layer of memory cells 112 in the selected block 140 to be impacted by read and program operations.

In some examples, each word line 120 is coupled to a page 150 to which the memory cells 112 pertain and which is the basic data unit for program operations. The size of one page 150 in bytes can be related to the number of memory strings 111 coupled with the word line 120 in one block 140. Each word line 120 may be coupled to a control gate (i.e., a gate electrode) of each memory cell 112 in a respective page 150. It can be understood that one row of memory cells is a plurality of memory cells 112 on the same page 150.

It is to be noted that the same layer of memory cells in one block 140 corresponds to the same word line, but the same layer of memory cells may be divided into one or more pages. That is, one word line can be coupled to one or more pages, for example, to one page for SLC, and to two pages for MLC.

Figure 5:
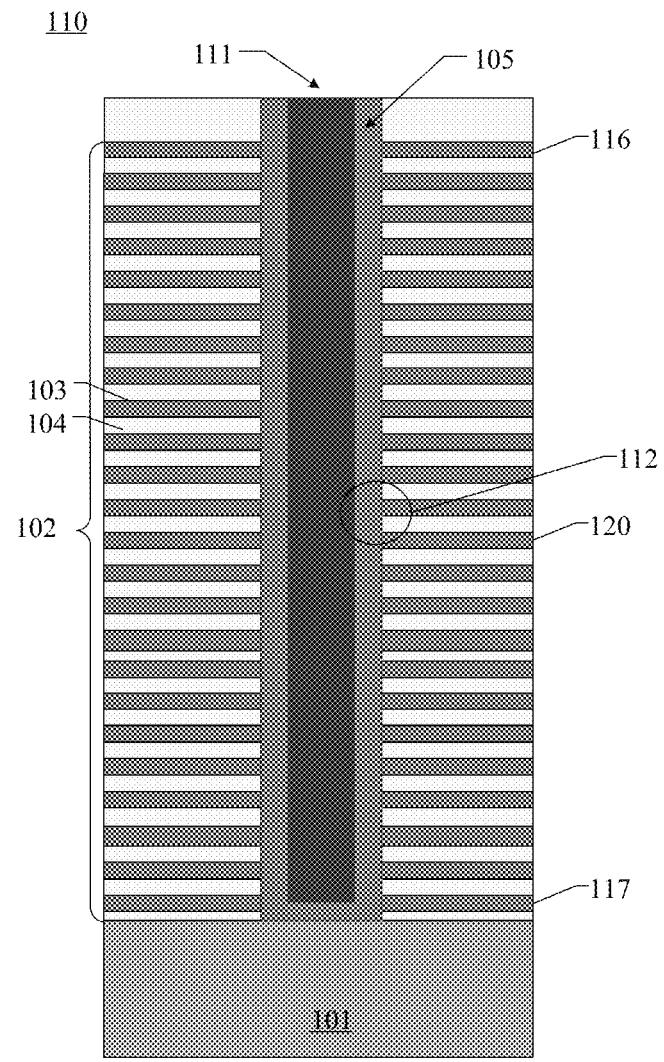
FIG. 5 is a sectional schematic diagram of a memory array comprising memory strings provided by examples of the present application.

FIG. 5 is a sectional schematic diagram of a memory array 110 comprising a memory string 111 provided by examples of the present application. As shown in FIG. 5, the memory string 111 may extend vertically above a substrate 101 and penetrate through a stack layer 102. The substrate 101 may include silicon (e.g., single crystalline silicon), silicon germanium (SiGe), gallium arsenide (GaAs), germanium (Ge), silicon on insulator (SOI), germanium on insulator (GOI), or any other suitable materials.

The stack layer 102 may comprise alternate gate conductive layers 103 and gate-to-gate dielectric layers 104. The number of pairs of the gate conductive layers 103 and the gate-to-gate dielectric layers 104 in the stack layer 102 may determine the number of memory cells 112 in the memory array 110.

The gate conductive layers 103 may include conductive materials including, but not limited to, tungsten (W), cobalt (Co), copper (Cu), aluminum (Al), polysilicon, doped silicon, silicides, or any combination thereof. In some examples, each gate conductive layer 103 comprises a metal layer, e.g., a tungsten layer. In some other examples, each gate conductive layer 103 comprises a doped polysilicon layer. Furthermore, each gate conductive layer 103 may comprise a control gate around the memory cells 112, and can extend laterally at the top of the stack layer 102 as a DSG line 116, at the bottom of the stack layer 102 as an SSG line 117, or between the DSG line 116 and the SSG line 117 as a word line 120.

As shown in FIG. 5, the memory string 111 comprises a channel structure 105 extending vertically and penetrating through the stack layer 102. In some examples, the channel structure 105 comprises a channel hole filled with (one or more) semiconductor materials (e.g., as a semiconductor channel) and (one or more) dielectric materials (e.g., as a memory film). The semiconductor channel includes silicon, e.g., polysilicon. The memory film is a composite dielectric layer including a tunneling layer, a storage layer (also known as a "charge trap/storage layer"), and a blocking layer.

In some examples, the channel structure 105 has a cylindrical shape, e.g., a columnar shape. Various layers in the semiconductor channel and the memory film are arranged in the sequence radially from the center of the cylinder to the external surface of the cylinder.

It is to be understood that, although not shown in FIG. 5, the memory array 110 may further comprise other additional components, including, but not limited to a gate line slit/source contact, a local contact, an interconnect layer, etc.

Referring back to FIG. 4, the peripheral circuit 130 may be coupled to the memory array 110 through bit lines 115, word lines 120, source lines 118, SSG lines 117 and DSG lines 116. The peripheral circuit 130 may include any suitable analog, digital, and hybrid signal circuits for facilitating the operations of the memory array 110 by applying and sensing voltage signals and/or current signals to and from the memory cells 112 via bit lines 115, word lines 120, source lines 118, SSG lines 117, and DSG lines 116.

Figure 6:
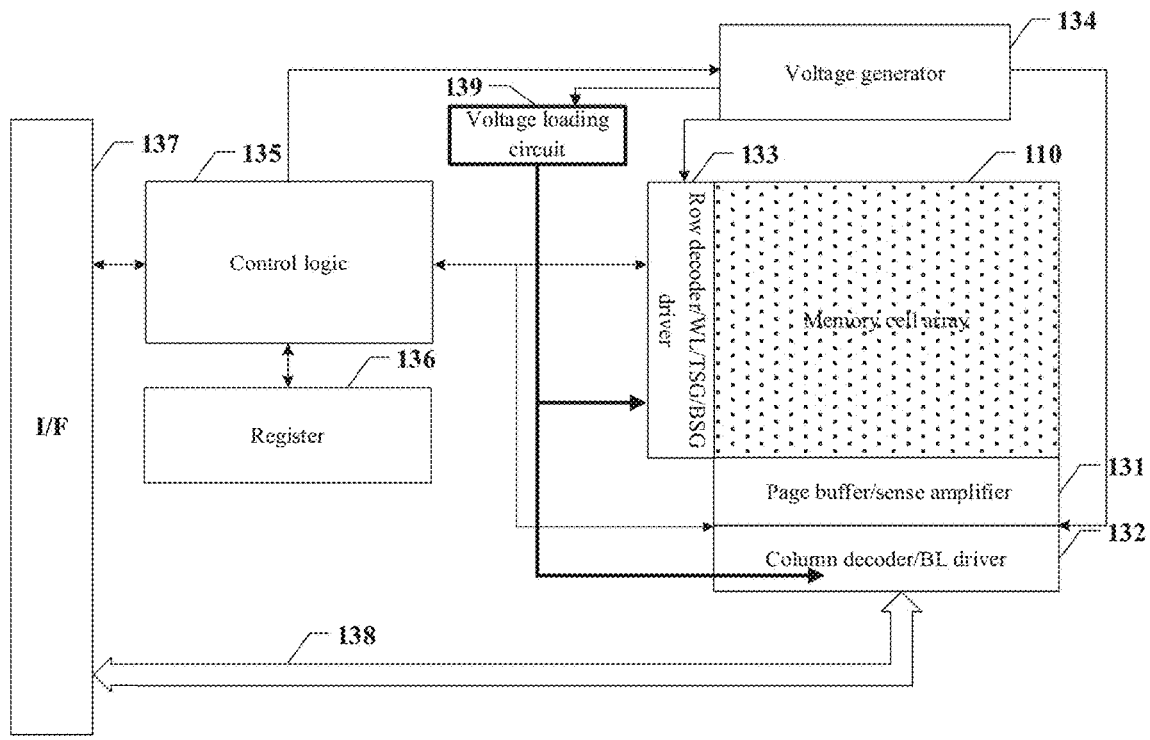
FIG. 6 is a schematic diagram of a peripheral circuit provided by examples of the present application and a memory array.

The peripheral circuit 130 may include various types of peripheral circuits formed using a metal-oxide-semiconductor (MOS) technology. For example, FIG. 6 illustrates some example peripheral circuits 130, including a page buffer/sense amplifier 131, a column decoder/bit line (BL) driver 132, a row decoder/word line (WL) driver/TSG driver/BSG driver 133, a voltage generator 134, a control logic 135, a register 136, an interface 137, and a data bus 138. It is understood that in some examples, additional peripheral circuits not shown in FIG. 6 may be also included.

The page buffer/sense amplifier 131 may be configured to read and program (write) data from and to the memory array 110 according to control signals from the control logic 135. For instance, the page buffer/sense amplifier 131 may store one page of program data (write data) to be programmed into one page 130 of the memory array 110. The page buffer/sense amplifier 131 may also perform verify operations to ensure that the data has been properly programmed into the memory cells 112 to which the selected word lines 120 are coupled. The page buffer/sense amplifier 131 may also sense low power signals from the bit lines 115 that represent data bits stored in the memory cells 112, and amplify small voltage swings to identifiable logic levels in read operations.

The column decoder/BL driver 132 may be configured to be controlled by the control logic 135. The row decoder/WL driver/TSG driver/BSG driver 133 may be configured to be controlled by the control logic 135. Thus, the selection of some memory cells in some block through the drivers, such as the BL driver, the WL driver, the TSG driver and the BSG driver, etc., is achieved.

For example, a bit line voltage generated by the voltage generator 134 is loaded to the bit lines through the BL driver, a word line voltage generated by the voltage generator 134 is loaded to the WLs through the WL driver, a TSG voltage generated by the voltage generator 134 is loaded to gates of the TSGs through the TSG driver, and a BSG voltage generated by the voltage generator 134 is loaded to gates of the BSGs through the BSG driver, thereby achieving selection of some memory cells in some block.

In addition, as shown in FIG. 6, the peripheral circuit 130 is further configured with a voltage loading circuit 139 that is used to load starting voltages generated by the voltage generator 134 to various drivers to start these drivers, so as to select some memory cells in some block through these drivers. The voltage loading circuit 139 may be, for example, implemented by a general voltage converter (such as a ROWDEC HV level shifter).

The voltage generator 134 may be configured to be controlled by the control logic 135 and generate a word line voltage (such as, a read voltage, a programming voltage, a pass voltage, a local voltage, a verify voltage, etc.), a bit line voltage and a source line voltage, etc. to be supplied to the memory array 110.

The control logic 135 may be coupled to each of the peripheral circuits described above and configured to control the operations of each circuit.

The register 136 may be coupled to the control logic 135 and may include a state register, a command register, and an address register for storing state information, command operation codes (OP codes), and command addresses for controlling the operations of each of the peripheral circuits.

The interface (I/F) 137 may be coupled to the control logic 135, and act as a control buffer to buffer and relay control commands received from a host (not shown) to the control logic 135 and state information received from the control logic 135 to the host. The interface 137 may also be coupled to the column decoder/bit line driver 132 via a data bus 138 and act as a data I/O interface and a data buffer to buffer and relay the data to and from the memory array 110.

The above description of the relevant hardware examples of the memory has similar advantageous effects to method examples below. Technical details not disclosed in the relevant hardware examples of the memory may be understood with reference to the description of the method examples of the present application.

As can be seen from FIG. 6, various drivers in the peripheral circuit are started by the voltage loading circuit. To facilitate understanding, the voltage loading circuit, and connection relationships between various drivers, and working principles are explained and illustrated below.

Figure 7:
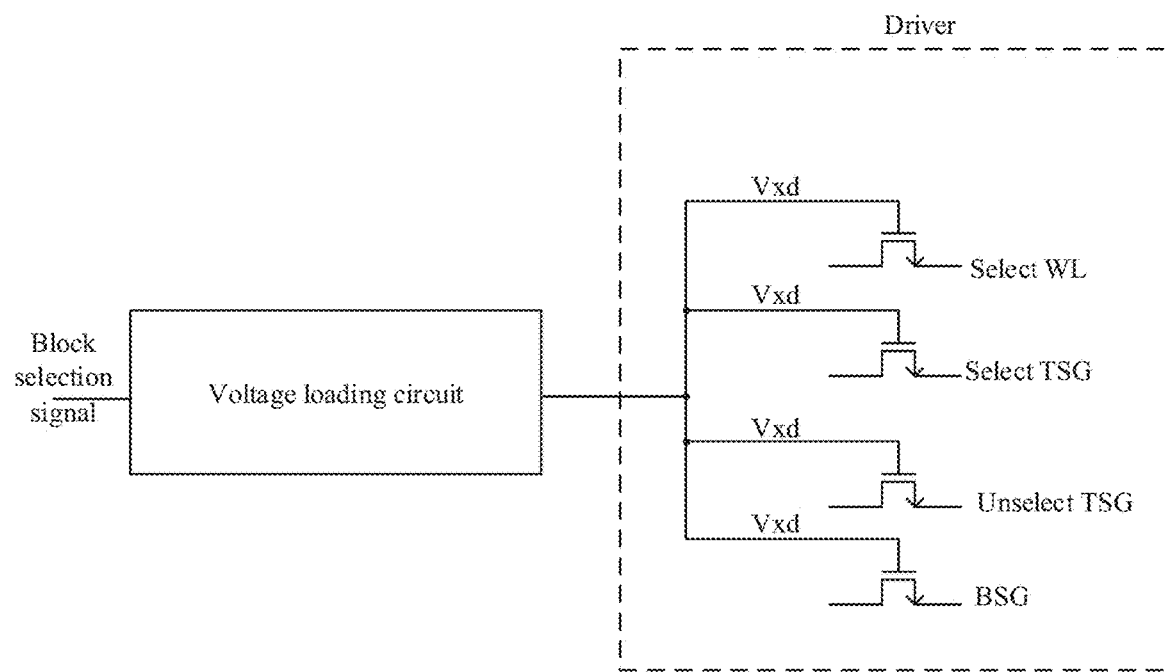
FIG. 7 is a schematic diagram of a voltage loading circuit and connection relationships between various drivers provided by examples of the present application.

FIG. 7 is a schematic diagram of a voltage loading circuit and connection relationships between various drivers provided by examples of the present application. As shown in FIG. 7, various drivers are, for example, metal-oxide-semiconductor field-effect transistors (MOSFETs); accordingly, each driver comprises a gate, a drain and a source; in this scenario, the gates act as control terminals of the drivers; accordingly, starting voltages loaded to the control terminals (i.e., the gates) of the drivers may be called gate voltages, and the gates of the drivers or the gate voltages of the drivers involved in subsequent examples may all refer to this explanation.

As shown in FIG. 7, a driver coupled with a WL (including a select WL and an unselect WL) may be called a WL driver, a driver coupled with a TSG (including a select TSG and an unselect TSG) may be called a TSG driver, and a driver coupled with a BSG (including a select BSG and an unselect BSG) may be called a BSG driver. It is noted that FIG. 7 does not show all the drivers in the peripheral circuit, and connection relationships of other drivers may refer to the drivers shown in FIG. 7.

The connection relationships of various drivers are illustrated by taking the WL driver as an example. As shown in FIG. 7, a source of the WL driver is coupled with the WL, a gate of the WL driver is coupled with the voltage loading circuit, and a drain of the WL driver is coupled with a voltage generator. When a gate voltage Vxd loaded by the voltage loading circuit to the WL driver exceeds a threshold voltage of the WL driver, it is turned on between the drain and the source of the WL driver, i.e., the WL driver is started. At this point, a word line voltage loaded by the drain of the WL driver may be applied to a respective word line. Fox example, in a programming stage, if the word line voltage is a programming voltage, the respective word line is a select WL; and if the word line voltage is a non-programming voltage, the respective word line is an unselect WL.

Figure 8:
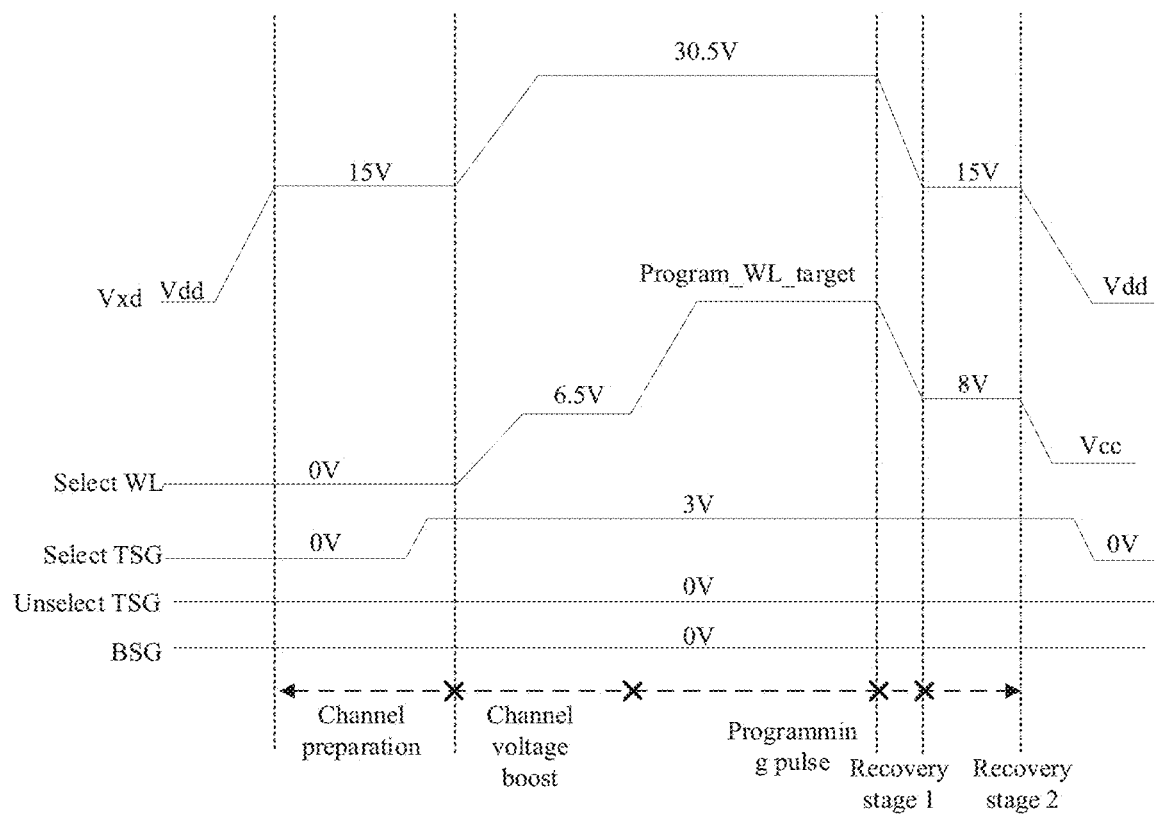
FIG. 8 is a schematic diagram of voltages loaded in a programming process provided by examples of the present application.

FIG. 8 is a schematic diagram of voltages loaded in a programming process provided by examples of the present application. As shown in FIG. 8, in the programming process in some examples, a voltage Program_WL_target loaded to a select WL is approximately 27V, a voltage loaded to a select TSG is 3V, and a voltage loaded to an unselect TSG and a BSG is 0V. That is, in the programming stage, an input voltage of a drain of a WL driver coupled with the select WL needs to be 27V, an input voltage of a drain of a TSG driver coupled with the select TSG needs to be 3V, an input voltage of a drain of the TSG driver coupled with the unselect TSG needs to be 0V, and an input voltage of a drain of a BSG driver coupled with all BSGs needs to be 0V.

Accordingly, in the programming stage, to turn on these drivers, a voltage loaded to a gate of the WL driver coupled with the select WL needs to be greater than 27V, a voltage loaded to a gate of the TSG driver coupled with the select TSG needs to be greater than 3V, a voltage loaded to a gate of the TSG driver coupled with the unselect TSG needs to be 0V, and a voltage loaded to a gate of the BSG driver coupled with all BSGs needs to be 0V.

In this scenario, in the scenario as shown in FIG. 7, if the same gate voltage (Vxd) is loaded to various drivers through the voltage loading circuit, the gate voltage Vxd loaded by the voltage loading circuit at least needs to be greater than 27V. Therefore, as shown in FIG. 8, the gate voltage Vxd loaded by the voltage loading circuit is approximately 30.5V to turn on all drivers.

However, when various drivers are turned on as described above, for the drivers with a low drain input voltage, the gate-drain voltage difference of these drivers after being turned on is larger, for example, the gate-drain voltage difference of the TSG driver coupled with the select TSG reaches about 30.5−3=27.5V, the gate-drain voltage difference of the TSG driver coupled with the unselect TSG reaches about 30.5−0=30.5V, and the gate-drain voltage difference of the BSG driver coupled with the BSG reaches about 30.5−0=30.5V. When the gate-drain voltage difference is larger, it easily causes a tunneling effect to occur within these drivers, i.e., the time-dependent gate breakdown (GBT) performance of these drivers becomes poor.

It is noted that, FIG. 8 is illustrated by taking the voltages loaded by the drains of various drivers in the programming process. For other operations of the memory, such as read operation, verify operation and erase operation, etc., the voltage loaded to the drain of the WL driver is usually also different from the voltages loaded to the drains of the TSG driver and the BSG driver in these operation processes. Therefore, in these operation processes, the use of the same gate voltage by all drivers may also cause performance degradation of some drivers, which is not described one by one in detail here.

Based on that, the examples of the present application have modified the voltage loading circuit to avoid the occurrence of a tunneling effect within the drivers when starting the drivers, thereby improving the performance degradation of the drivers.

Figure 9:
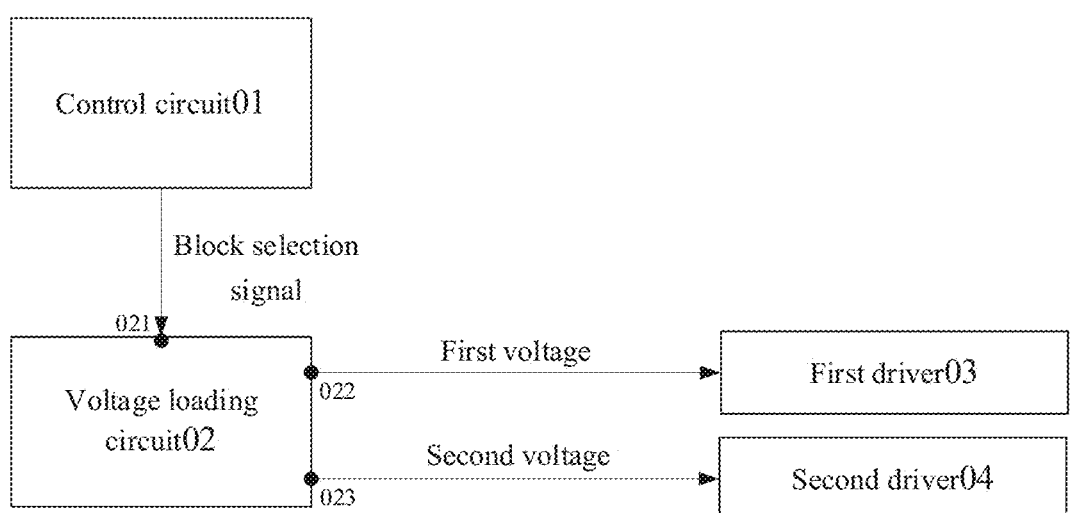
FIG. 9 is a structural schematic diagram of a memory provided by examples of the present application.

FIG. 9 is a structural schematic diagram of a memory provided by examples of the present application. As shown in FIG. 9, the memory 100 comprises a control circuit 01, a voltage loading circuit 02, a first driver 03 and a second driver 04.

As shown in FIG. 9, the voltage loading circuit 02 has a control terminal 021 coupled with an output terminal of the control circuit 01, a first output terminal 022 coupled with a control terminal of the first driver 03, and a second output terminal 023 coupled with a control terminal of the second driver 04.

The voltage loading circuit 02 is configured to load a first voltage to the control terminal of the first driver 03 through the first output terminal 022 and load a second voltage to the control terminal of the second driver 04 through the second output terminal 023 to select target memory cells in a target block within the memory 100 through the first driver 03 and the second driver 04, in response to a block selection signal received by the control terminal 021.

The first driver 03 and the second driver 04 may be any of the WL driver, the TSG driver, the BSG driver and the BL driver as shown in FIG. 6. In addition, the control circuit 01 may be, for example, the control logic in the peripheral circuit as shown in FIG. 6, and the voltage loading circuit 02 may be, for example, the voltage loading circuit in the peripheral circuit as shown in FIG. 6.

In a scenario in which the drivers are implemented by MOS transistors, the control terminal of the first driver and the control terminal of the second driver are both the gate of the MOS transistors. At this point, in the memory as shown in FIG. 9, since gate voltages may be loaded to different drivers by different output terminals of the voltage loading circuit to start the drivers, all the drivers do not share the same gate voltage any longer and different drivers may use different gate voltages, thereby avoiding the performance degradation of some drivers caused by a large gate-drain voltage difference due to the use of the same gate voltage. Therefore, based on the memory provided by the examples of the present application, the performance degradation of the various drivers can be improved.

In some examples, the first driver comprises a WL driver, and the second driver comprises at least one of a TSG driver and a BSG driver. In this scenario, the first voltage is greater than the second voltage in a normal programming mode of the memory.

Since the second voltage is less than the first voltage, in the normal programming process, in the event that the first voltage is 30.5V as shown in FIG. 8, the second voltage may be lower than 30.5V, thereby reducing the gate-drain voltage difference of the TSG driver and/or the BSG driver and avoiding a threshold voltage excursion of the TSG driver and/or the BSG driver due to the large gate-drain voltage difference. Therefore, the performance degradation of the TSG driver and/or the BSG driver may be improved.

Figure 10:
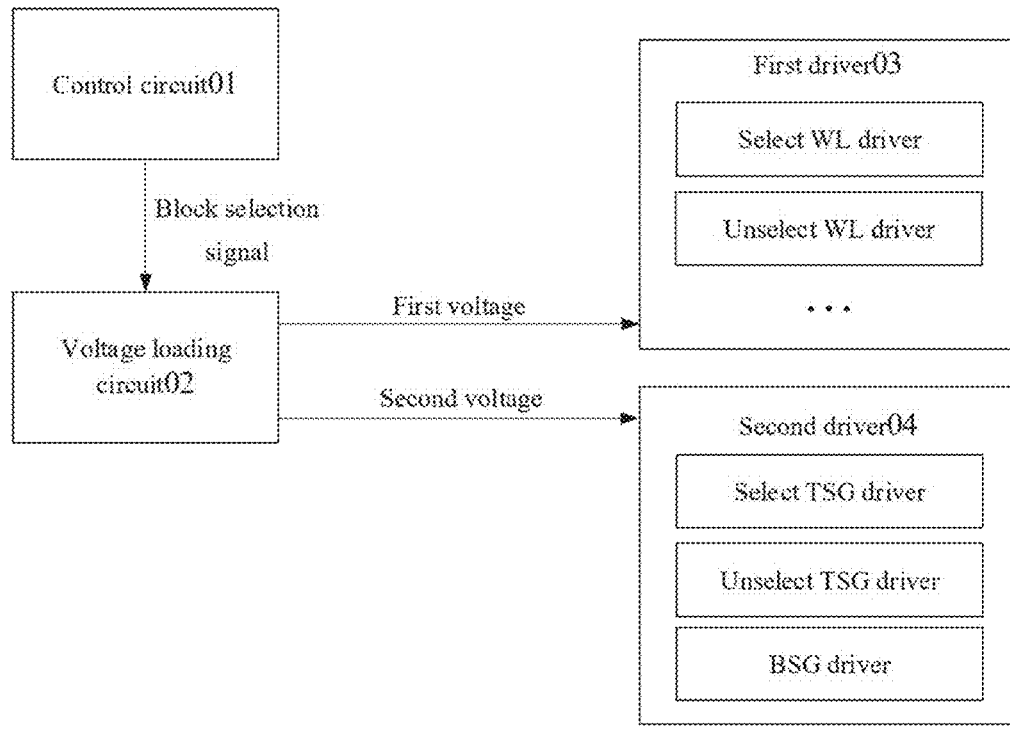
FIG. 10 is a structural schematic diagram of another memory provided by examples of the present application.

FIG. 10 is a structural schematic diagram of another memory provided by examples of the present application. As shown in FIG. 10, the second driver 04 comprises a TSG driver and a BSG driver, and the first driver 03 comprises other drivers, such as a WL driver, etc.

The WL driver includes a select WL driver and an unselect WL driver, the TSG driver includes a select TSG driver and an unselect TSG driver, and the BSG driver may also include a select BSG driver and an unselect BSG driver (not shown in FIG. 10).

As can be seen from drain voltages of various drivers in a programming process as shown in FIG. 8, in the programming process, the drain voltages of the TSG driver and the BSG driver are low, while the drain voltage of the WL driver is high. Therefore, in the examples of the present application, the voltage loading circuit is configured with a first output terminal for the WL driver to load a first voltage, and the voltage loading circuit is configured with a second output terminal for the BSG driver and the TSG driver to load a second voltage, to avoid the performance degradation of the BSG driver and the TSG driver due to the use of the same gate voltage.

Optionally, in examples of the present application, to further improve the performance degradation of various drivers, one output terminal may be independently configured in the voltage loading circuit 02 for each driver to load an independent gate voltage for each driver, which is not described in detail any longer here.

In the examples of the present application, the voltage loading circuit in the peripheral circuit as shown in FIG. 6 may be modified, to make the modified voltage loading circuit 02 load different voltages to the control terminal of the first driver 03 and the control terminal of the second driver 04 through the first output terminal and the second output terminal respectively.

Figure 11:
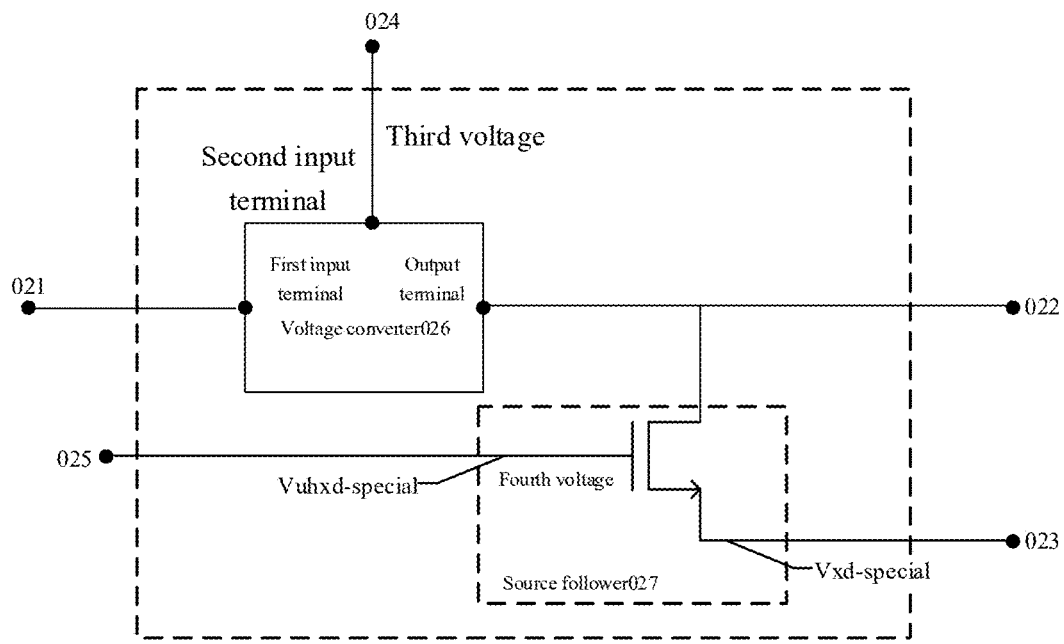
FIG. 11 is a structural schematic diagram of another memory provided by examples of the present application.

In some examples, as shown in FIG. 11, the voltage loading circuit 02 further has a first power loading terminal 024 and a second power loading terminal 025, and the voltage loading circuit 02 comprises a voltage converter 026 and a source follower 027.

A first input terminal of the voltage converter 026 is coupled with the control terminal 021, a second input terminal of the voltage converter 026 is coupled with the first power loading terminal 024, an output terminal of the voltage converter 026 is coupled with the first output terminal 022, a first input terminal of the source follower 027 is coupled with the output terminal of the voltage converter 026, a second input terminal of the source follower 027 is coupled with the second power loading terminal 025, and an output terminal of the source follower 027 is coupled with the second output terminal 023.

To facilitate understanding, the working principle of the source follower 027 is explained and illustrated first. As shown in FIG. 11, the source follower may be implemented through an enhancement-N-metal oxide semiconductor field effect transistor (NEMOS). For the NEMOS transistor, when the voltage difference between a gate and a drain of the NEMOS transistor is greater than a threshold voltage of the NEMOS transistor, the source voltage of the NEMOS transistor will vary as the gate voltage varies. For example, a voltage loaded by the gate of the source follower 027 (i.e., a fourth voltage loaded by the second power loading terminal) is labeled as Vuhxd-special, a voltage output by the source of the source follower 027 is labeled as vxd-special, and vxd-special=Vuhxd-special-Vth, where Vth is the threshold voltage of the source follower.

In the voltage loading circuit 02 as shown in FIG. 11, a starting voltage is loaded to the first driver, such as the WL driver, etc., by the voltage converter 026 through the first output terminal 022, and one source follower 027 is added on the basis of the voltage converter 026 to load the starting voltage to the second driver, such as the BSG driver and the TSG driver, etc., through the second output terminal 023.

As compared with the technical solution that all drivers are provided with the same starting voltage directly through the voltage converter 026 and the first output terminal 022, the addition of one source follower 027 on the basis of the voltage converter 026 in the voltage loading circuit 02 provided by the examples of the present application can achieve the technical effect of the examples of the present application, which is easy to achieve, without excessive changes to the existing peripheral circuit or significant sacrifices of the chip area. Therefore, the examples of the present application provide a technical solution that improves the performance degradation of the drivers while ensuring the chip area will not increase significantly.

In the memory as shown in FIG. 11, for example, the voltage converter 026 is configured to output a first voltage to the first output terminal 022 and the source follower 027 in response to a block selection signal and a third voltage loaded to the first power loading terminal 024; and the source follower 027 is configured to output a second voltage to the second output terminal 023 in response to the first voltage and a fourth voltage loaded to the second power loading terminal 025.

Figure 12:
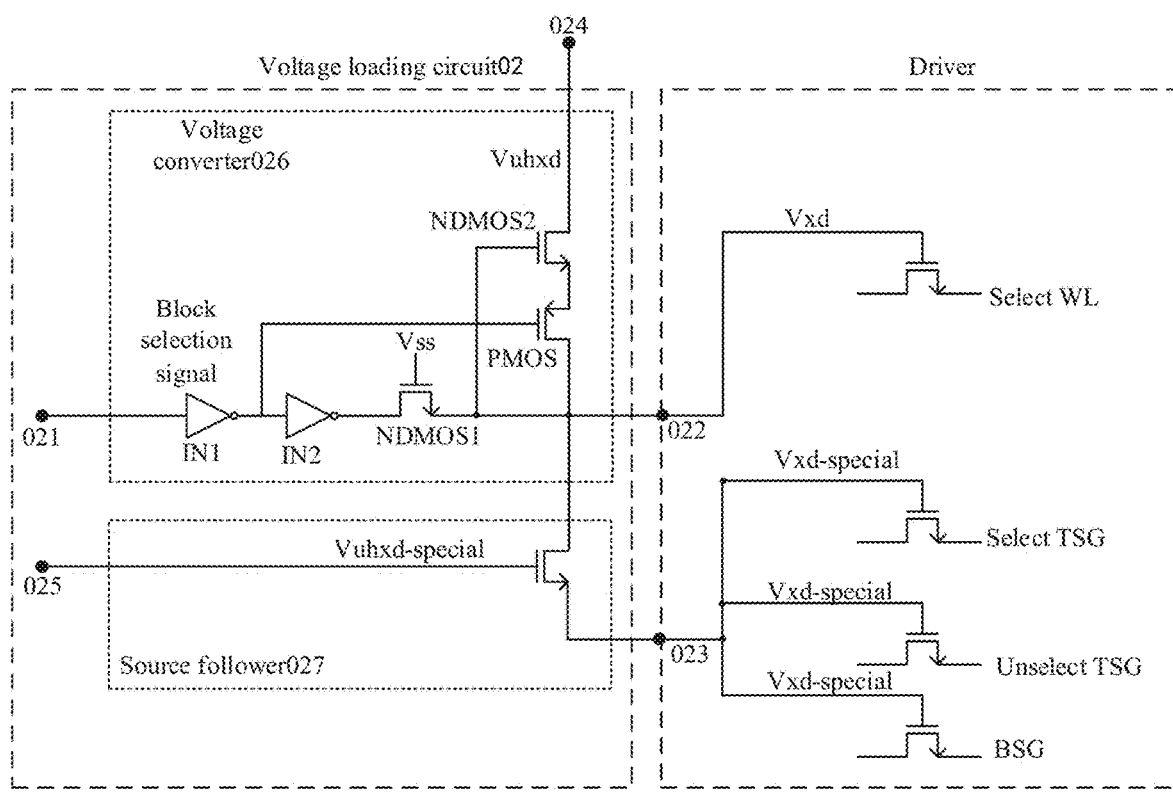
FIG. 12 is a structural schematic diagram of a voltage converter provided by examples of the present application.

For example, FIG. 12 is a structural schematic diagram of a voltage converter 026 provided by examples of the present application. As shown in FIG. 12, the voltage converter 026 comprises a first phase inverter, a second phase inverter, a first depletion-N-metal oxide semiconductor field effect transistor (NDMOS) transistor, a second NDMOS transistor and a P-metal oxide semiconductor field effect transistor (PMOS) transistor, which are labeled as IN1, IN2, NDMOS1, NDMOS2 and PMOS respectively in FIG. 12.

As shown in FIG. 12, an input terminal of the first phase inverter (IN1) is coupled with the control terminal 021 to receive the block selection signal, an output terminal of the first phase inverter (IN1) is coupled with an input terminal of the second phase inverter (IN2) and a gate of the PMOS transistor respectively, an output terminal of the second phase inverter (IN2) is coupled with an input terminal of the first NDMOS transistor (NDMOS1), and an output terminal of the first NDMOS transistor (NDMOS1) is coupled with a gate of the second NDMOS transistor (NDMOS2).

An input terminal of the second NDMOS transistor (NDMOS2) is coupled with the first power loading terminal 024, an output terminal of the second NDMOS transistor (NDMOS2) is coupled with an input terminal of the PMOS transistor, and an output terminal of the PMOS transistor is connected in parallel with the output terminal of the first NDMOS transistor (NDMOS1) and then coupled with the first output terminal 022.

In this scenario, the first voltage is equal to the third voltage, i.e., Vuhxd is equal to Vxd in FIG. 12. In other words, in the voltage converter 026 as shown in FIG. 12, the voltage converter 026 outputs the first voltage (Vuhxd) loaded to the first power loading terminal to the control terminal of the first driver, such as the WL driver, etc., through the first output terminal, in response to the block selection signal.

To facilitate understanding, the working principle of the voltage converter 026 as shown in FIG. 12 is explained and illustrated here. As shown in FIG. 12, when the input terminal of the first phase inverter (IN1) receives a control signal, it is equivalent to that a positive voltage is loaded to the input terminal of the first phase inverter (IN1); accordingly, the output terminal of the first phase inverter (IN1) outputs a negative voltage. Therefore, the PMOS transistor may be driven to be turned on. And a voltage at the output terminal of the second phase inverter (IN2) is a positive voltage. For the NDMOS transistor, since there are many holes in the channel of the NDMOS transistor, when the gate of the NDMOS transistor 1 is grounded, i.e., the gate voltage is Vss, the NDMOS transistor 1 may be in an ON-state, and the positive voltage at the output terminal of the second phase inverter (IN2) is output and loaded to the gate of the NDMOS transistor 2 from the source to turn on the NDMOS transistor 2. In the event that the NDMOS transistor 2 and the PMOS transistor are turned on, the first voltage Vuhxd loaded to the first power loading terminal may be output from the first output terminal 022, i.e., Vxd=Vuhxd.

Additionally, as shown in FIG. 12, a self-feedback loop is formed between the second NDMOS transistor (NDMOS2) and the PMOS transistor, which is for the purpose of ensuring the voltage Vxd output by the first output terminal 022 is stabilized at Vuhxd.

It is noted that, the voltage converter 026 as shown in FIG. 12 is an example, the examples of the present application do not define the internal structure of the voltage converter 026, and any voltage converter capable of achieving a level conversion function may be applied in the voltage loading circuit 02 provided by the examples of the present application.

Additionally, FIGS. 11 and 12 are used to illustrate how to provide different starting voltages for different drivers. Optionally, in the examples of the present application, the voltage loading circuit is not limited to the structures as shown in FIGS. 11 and 12, for example, provision of different starting voltages to different drivers may be achieved by multiple independent voltage converters, which is not described in detail any longer here.

In addition, in different operation modes of the memory, the drain voltage of the same driver may be different. For example, for the same driver, the drain voltages of the driver in the programming mode and the read mode are usually different.

Based on that, to further improve the performance degradation of the drivers, in some examples, the fourth voltages loaded to the second power loading terminal 025 in a first operation mode and a second operation mode are different. The first operation mode and the second operation mode are two different ones of a plurality of operation modes of the memory that include a TSG programming mode, a BSG programming mode, a normal programming mode, a preprogramming mode, a read mode, a verify mode and an erase mode.

That is, in the examples of the present application, for the same driver, different fourth voltages may be loaded to the second power loading terminal 025 in different operation modes, thereby outputting different second voltages to achieve different starting voltages received by the control terminal of the driver in different operation modes to further improve the performance degradation of the driver.

The TSG programming mode refers to an operation mode for programming TSGs in memory strings, the BSG programming mode refers to an operation mode for programming BSGs in the memory strings, and the normal operation mode refers to an operation mode for programming memory cells for writing data in the memory strings. As can be seen from the structure of the memory 100 as shown in FIG. 4, the memory string not only comprises the memory cells really used for storing data, but also comprises the TSGs and BSGs over and under the memory string. Before performing programming or reading or erasing on the memory cells, the TSGs and the BSGs are often needed to be put into certain charge states, and this process is TSG programming and BSG programming.

In addition, the preprogramming mode refers to an operation mode for programming the memory cells before performing the erase operation, the read mode refers to an operation mode for reading data from the memory cells of the memory string, the verify mode refers to an operation mode for verifying voltage states of the memory cells in a process of programming the memory cells, and the erase operation refers to an operation mode for erasing the data stored in the memory cells.

For example, the fourth voltage loaded to the second power loading terminal 025 in any of the TSG programming mode and the BSG programming mode is greater than that loaded in any of the read mode and the verify mode; and the fourth voltage loaded to the second power loading terminal 025 in any of the read mode and the verify mode is greater than that loaded in any of the normal programming mode, the preprogramming mode and the erase programming mode.

Table 1 shows the values of the fourth voltages Vuhxd-special loaded to a second power loading terminal 025 in different operation modes provided by examples of the present application. In Table 1, vxd-special represents values of corresponding second voltages, and Table 1 is for the voltage loading circuit 02 as shown in FIG. 12.

TABLE 1

|  | Fourth voltage (Vuhxd-special) | Second voltage (vxd-special) |
| --- | --- | --- |
| TSG programming mode/ BSG programming mode | Equal to Vuhxd Approximately (30.5 + Vth) V | 30.5 V |
| Normal programming mode/ preprogramming mode | 15 V | (15 − Vth) V |
| Read mode/verify mode | 20 V | (20 − Vth) V |
| Erase mode | 15 V | (15 − Vth) V |

As shown in Table 1, in the TSG programming mode or the BSG programming mode, to enable programming for TSGs or BSGs, voltages applied to gates of the TSGs or BSGs need to reach the programming voltage (Program WL_target) as shown in FIG. 8. Accordingly, voltages applied to gates of the TSG drivers or BSG drivers need to reach 30.5V. Accordingly, the voltage loaded to the second power loading terminal at least needs to be 30.5+Vth, where Vth is the threshold voltage of the source follower.

The normal programming mode, the preprogramming mode and the erase mode are illustrated by taking the normal programming mode as shown in FIG. 8 as an example. As shown in FIG. 8, in the normal programming mode, the voltage loaded to the gates of the select TSGs is approximately 3V, and the voltages loaded to the gates of the unselect TSGs and the BSGs are both 0V. Therefore, to enable to turn on the TSGs and the BSGs in these operation modes, the source output voltages of the TSG driver and the BSG driver are at least 3V. Accordingly, the voltage loaded to the gate of the TSG driver needs to be at least 3V plus the threshold voltage of the TSG driver, and the voltage loaded to the gate of the BSG driver needs to be at least 3V plus the threshold voltage of the BSG driver. Therefore, the fourth voltage loaded to the second power loading terminal needs to be at least 3V plus the threshold voltage of the TSG driver (or the BSG driver) plus the threshold voltage of one source follower.

As shown in Table 1, in the normal programming mode, the preprogramming mode and the erase mode, the above conditions can be met when the fourth voltage Vuhxd-special loaded to the second power loading terminal is equal to 15V.

In addition, as shown in Table 1, in the read mode or the verify mode, the fourth voltage Vuhxd-special loaded to the second power loading terminal is equal to 20V. Given that in these operation modes, the voltages output by the sources of the TSG driver and the BSG driver are usually higher than 3V, in order to further improve the performance degradation of the TSG driver and the BSG driver, the fourth voltage Vuhxd-special loaded to the second power loading terminal in the read mode or the verify mode is set higher.

Optionally, for the voltage loading circuit as shown in FIG. 12, in the examples of the present application, the fourth voltages Vuhxd-special loaded to the second power loading terminal in the normal programming mode, the preprogramming mode, the erase mode, the read mode and the verify mode may all be set as 15V. In this scenario, two supply voltages, 15V and (30.5+Vth) V, may be provided to the voltage loading circuit 02 such that the internal structure of the peripheral circuit can be simplified, and excessive sacrifices of the chip area are avoided.

Figure 13:
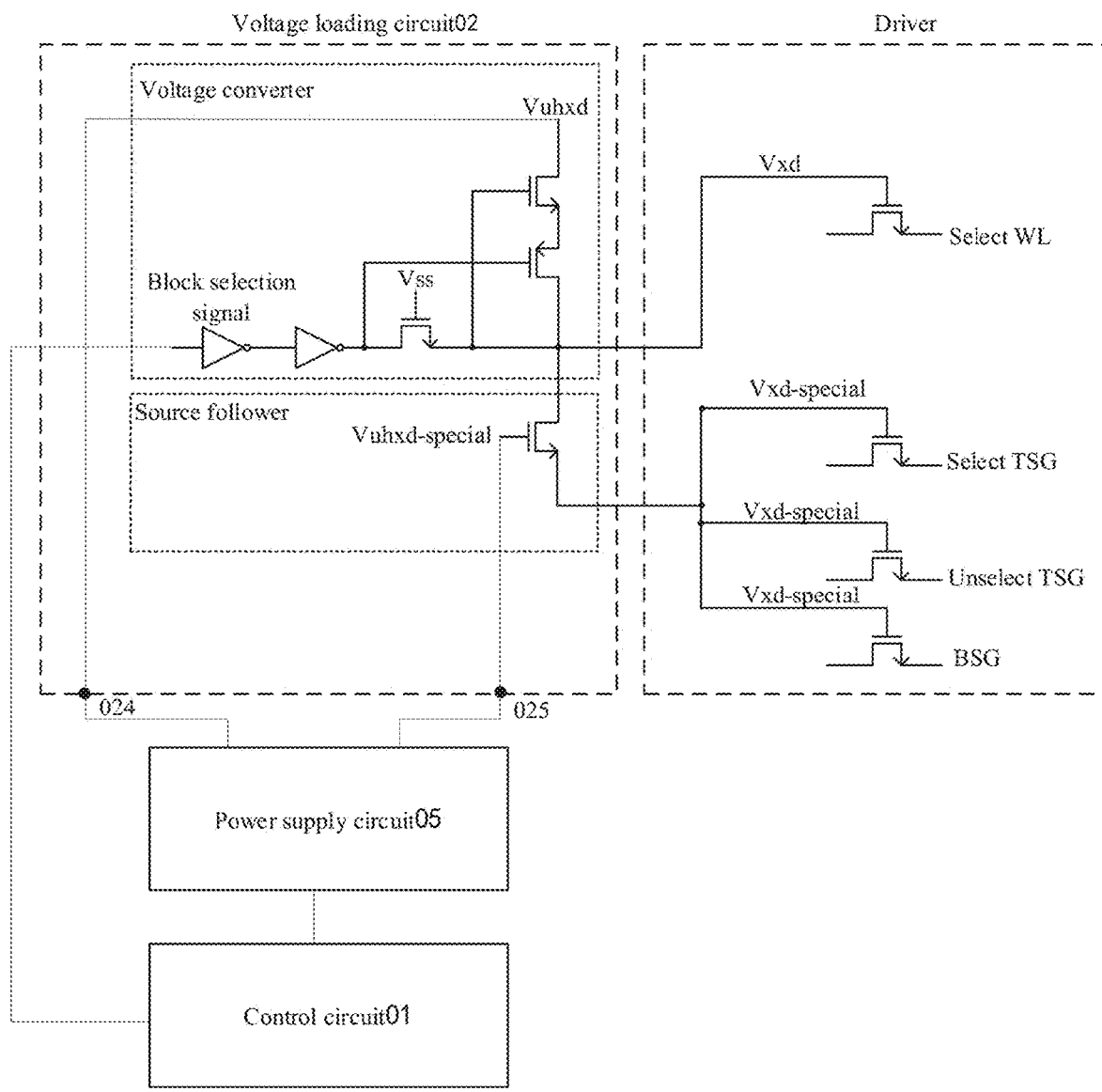
FIG. 13 is a structural schematic diagram of another memory provided by examples of the present application.

Additionally, in some examples, as shown in FIG. 13, the memory further comprises a power supply circuit 05. In this scenario, the second power loading terminal 025 is coupled with the power supply circuit 05 that is used to load different fourth voltages to the second power loading terminal 025 in the first operation mode and the second operation mode respectively.

The power supply circuit 05 may be, for example, implemented through the voltage generator as shown in FIG. 6.

As shown in FIG. 13, the power supply circuit 05 is further coupled with a control circuit 01 that is used to send different control signals to the power supply circuit 05 in different operation modes to control the power supply circuit 05 to load different fourth voltages to the second power loading terminal 025 in different operation modes.

To sum up, in the examples of the present application, the first voltage is loaded by the first output terminal of the voltage loading circuit to the control terminal of the first driver to start the first driver, the second voltage is loaded by the second output terminal of the voltage loading circuit to the control terminal of the second driver to start the second driver, and thus, different starting voltages may be loaded by different output terminals of the voltage loading circuit to different drivers in the memory. That is, all the drivers do not share the same starting voltage any longer; instead, different drivers can use different starting voltages, thereby avoiding performance degradation of some drivers caused by a tunneling effect due to the use of the same starting voltage. Therefore, based on the memory provided by the examples of the present application, the performance degradation of the various drivers can be improved.

Figure 14:
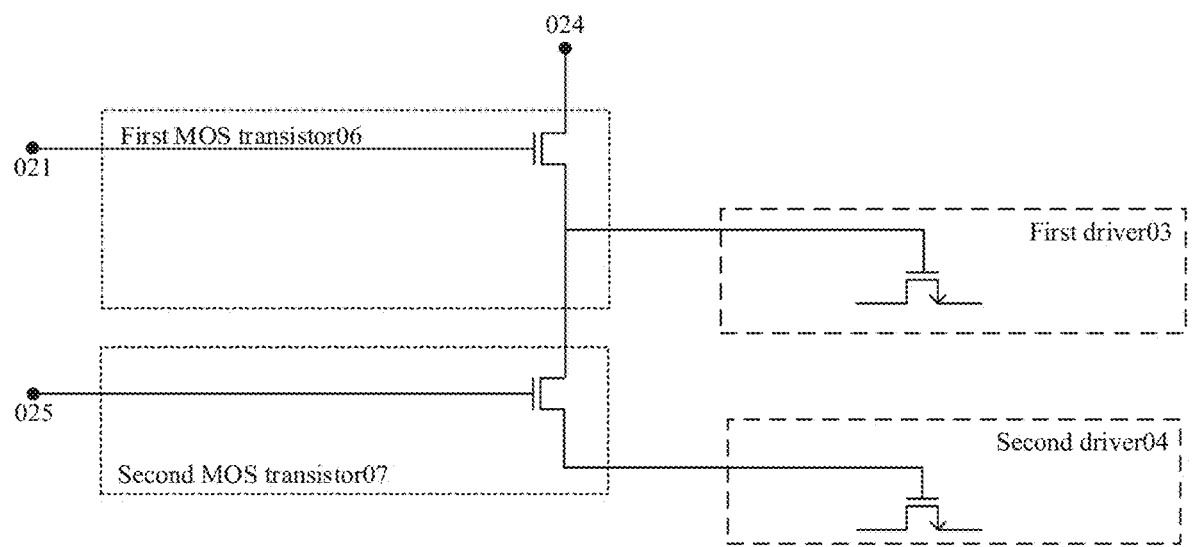
FIG. 14 is a structural schematic diagram of another memory provided by examples of the present application.

FIG. 14 is a structural schematic diagram of another memory provided by examples of the present application. As shown in FIG. 14, the memory comprises a first MOS transistor 06, a second MOS transistor 07, a first driver 03 and a second driver 04. An output terminal of the first MOS transistor 06 is coupled with a control terminal of the first driver 03, and an output terminal of the second MOS transistor 07 is coupled with a control terminal of the second driver 04;

The first MOS transistor 06 is configured to load a first voltage to the control terminal of the first driver 03, and the second MOS transistor 07 is configured to load a second voltage to the control terminal of the second driver 04, so as to select target memory cells in a target block within the memory through the first driver 03 and the second driver 04.

In the memory as shown in FIG. 14, different starting voltages are applied to the control terminals of different drivers through different MOS transistors. Therefore, all the drivers do not share the same starting voltage any longer; instead, different drivers can use different starting voltages, thereby avoiding performance degradation of some drivers caused by a tunneling effect due to the use of the same starting voltage. Therefore, based on the memory provided by the examples of the present application, the performance degradation of the various drivers can be improved.

In some examples, the first driver 03 comprises a WL driver, and the second driver 04 comprises at least one of a TSG driver and a BSG driver. In this scenario, the first voltage is greater than the second voltage in the normal programming mode of the memory. The specific implementations may be referred to the relevant explanations of FIG. 10, which will not be repeated here.

In addition, in some examples, as shown in FIG. 14, the memory has a first power loading terminal 024 and a second power loading terminal 025. In this scenario, an input terminal of the first MOS transistor 06 is coupled with the first power loading terminal 024, an output terminal of the first MOS transistor 06 is further coupled with an input terminal of the second MOS transistor 07, and a gate of the second MOS transistor 07 is coupled with the second power loading terminal 025.

In this scenario, the first MOS transistor 06 is configured to output a first voltage to the first driver 03 and the second MOS transistor 07 in response to a third voltage loaded to the first power loading terminal 024; and the second MOS transistor 07 is configured to output a second voltage to the second driver 04 in response to the first voltage and a fourth voltage loaded to the second power loading terminal 025.

Through the above configuration, the second MOS transistor 07 serves as a source follower to output the fourth voltage loaded to the second power loading terminal to the control terminal of the first driver through the second MOS transistor 07, to load the second voltage to the control terminal of the first driver. The specific implementations may be referred to the relevant contents of FIG. 11, which will not be repeated here either.

In addition, in some examples, the first MOS transistor 06 is a P-metal oxide semiconductor PMOS transistor, and the memory further comprises a first phase inverter, a second phase inverter, a first NDMOS transistor and a second NDMOS transistor.

An input terminal of the first phase inverter is used to receive a block selection signal, an output terminal of the first phase inverter is coupled with an input terminal of the second phase inverter and a gate of the PMOS transistor respectively, an output terminal of the second phase inverter is coupled with an input terminal of the first NDMOS transistor, an output terminal of the first NDMOS transistor is coupled with a gate of the second NDMOS transistor; an input terminal of the second NDMOS transistor is coupled with the first power loading terminal 024, an output terminal of the second NDMOS transistor is coupled with an input terminal of the PMOS transistor, and an output terminal of the PMOS transistor is coupled with the output terminal of the first NDMOS transistor.

In this scenario, the first voltage is equal to the third voltage.

Outputting the third voltage loaded to the first power loading terminal to the control terminal of the first driver may be achieved through the first phase inverter, the second phase inverter, the first NDMOS transistor, the second NDMOS transistor and the first MOS transistor, to load the first voltage to the control terminal of the first driver. The specific implementations may be referred to the relevant contents of FIG. 12, which will not be repeated here either.

In addition, in some examples, the fourth voltages loaded to the second power loading terminal 025 in a first operation mode and a second operation mode are different. The first operation mode and the second operation mode are two different ones of a plurality of operation modes of the memory that include a TSG programming mode, a BSG programming mode, a normal programming mode, a preprogramming mode, a read mode, a verify mode and an erase mode.

For example, the fourth voltage loaded to the second power loading terminal 025 in any of the TSG programming mode and the BSG programming mode is greater than that loaded in any of the read mode and the verify mode; and the fourth voltage loaded to the second power loading terminal 025 in any of the read mode and the verify mode is greater than that loaded in any of the normal programming mode, the preprogramming mode and the erase programming mode.

The specific implementations may be referred to the relevant explanations of Table 1, which will not be repeated here.

Figure 15:
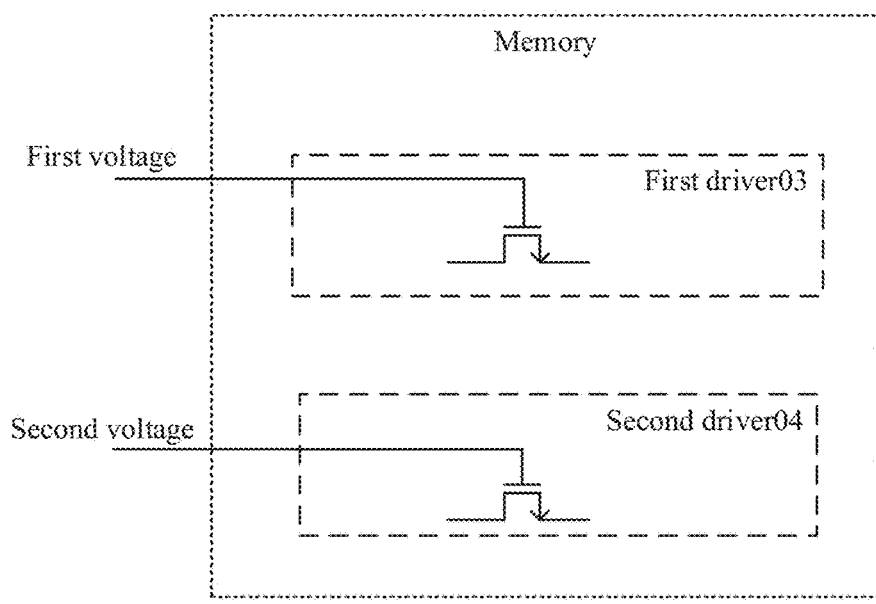
FIG. 15 is a structural schematic diagram of another memory provided by examples of the present application.

FIG. 15 is a structural schematic diagram of another memory provided by examples of the present application. As shown in FIG. 15, the memory comprises a first driver 03 and a second driver 04. The first driver 03 is configured to receive a first voltage through a control terminal and receive a fifth voltage through an input terminal, and the second driver 04 is configured to receive a second voltage through a gate and receive a sixth voltage through an input terminal, so as to select target memory cells in a target block within the memory. The magnitude relationship between the first voltage and the second voltage is the same as that between the fifth voltage and the sixth voltage.

In some examples, the first driver 03 comprises a word line WL driver, and the second driver 04 comprises at least one of a top select gate TSG driver and a bottom select gate BSG driver. In this scenario, the fifth voltage is greater than the sixth voltage, and the first voltage is greater than the second voltage, in the normal programming mode of the memory.

In addition, in some examples, the second voltages received by the control terminal of the second driver 04 in a first operation mode and a second operation mode are different.

The first operation mode and the second operation mode are two different ones of a plurality of operation modes of the memory that include a TSG programming mode, a BSG programming mode, a normal programming mode, a preprogramming mode, a read mode, a verify mode and an erase mode.

For example, the second voltage received by the control terminal of the second driver 04 in any of the TSG programming mode and the BSG programming mode is greater than that received in any of the read mode and the verify mode; and the second voltage received by the control terminal of the second driver 04 in any of the read mode and the verify mode is greater than that received in any of the normal programming mode, the preprogramming mode and the erase programming mode.

The specific connection relationship of the memory as shown in FIG. 15 may be referred to the memory as shown in any of FIGS. 9-14, to achieve that the first driver and the second driver in the memory as shown in FIG. 15 do not share the same starting voltage any longer, thereby avoiding the performance degradation of some drivers caused by a tunneling effect due to the use of the same starting voltage. Therefore, based on the memory provided by the examples of the present application, the performance degradation of various drivers can be improved.

Optionally, it may also be achieved that the first driver and the second driver in the memory as shown in FIG. 15 do not share the same starting voltage any longer by other means than those shown in FIGS. 9-14, which are not illustrated one by one any longer here.

In the examples of the present application, the terms "first", "second" and the like are used to distinguish similar objects, and are not necessarily used to describe a specific sequence or sequential order. It may be understood that "first", "second" and the like may be interchanged in a specific sequence or sequential order when the condition allows, so that the examples of the present application described herein can be implemented in other sequence than those shown or described herein.

It is to be understood that, references throughout this specification to "some examples" mean that particular features, structures, or characteristics related to the examples are included in at least one example of the present application. Thus, "in some examples" or "in some other examples" throughout this specification are not necessarily referring to the same example. Furthermore, these particular features, structures, or characteristics may be incorporated in one or more examples in any suitable manner.

It is to be noted that, the terms "comprise", "include" or any variants thereof herein are intended to cover non-exclusive inclusion, such that a process, a method, an article or a device comprising a series of elements comprise not only those elements, but also other elements not listed explicitly, or further comprise elements inherent to this process, method, article or device. In the case of no more limitations, an element defined by the phrase "comprising one" do not preclude the presence of another identical element in the process, method, article or device comprising this element.

The foregoing examples of the present application provide memories, storage systems, and electronic products, which may improve the performance degradation of drivers. Examples of the technical solution are as follows:

In an aspect, a memory is provided, which comprises a control circuit 01, a voltage loading circuit 02, a first driver 03 and a second driver 04, where the voltage loading circuit 02 has a control terminal 021 coupled with an output terminal of the control circuit 01, a first output terminal 022 coupled with a control terminal of the first driver 03, and a second output terminal 023 coupled with a control terminal of the second driver 04; the voltage loading circuit 02 is configured to load a first voltage to the control terminal of the first driver 03 through the first output terminal 022 and load a second voltage to the control terminal of the second driver 04 through the second output terminal 023 in order to select target memory cells in a target block within the memory through the first driver 03 and the second driver 04, in response to a block selection signal received by the control terminal 021.

Optionally, the first driver 03 comprises a word line WL driver, and the second driver 04 comprises at least one of a top select gate TSG driver and a bottom select gate BSG driver; the first voltage is greater than the second voltage in a normal programming mode of the memory.

Optionally, the voltage loading circuit 02 further has a first power loading terminal 024 and a second power loading terminal 025, and the voltage loading circuit 02 comprises a voltage converter 026 and a source follower 027; a first input terminal of the voltage converter 026 is coupled with the control terminal 021, a second input terminal of the voltage converter 026 is coupled with the first power loading terminal 024, and an output terminal of the voltage converter 026 is coupled with the first output terminal 022; a first input terminal of the source follower 027 is coupled with the output terminal of the voltage converter 026, a second input terminal of the source follower 027 is coupled with the second power loading terminal 025, and an output terminal of the source follower 027 is coupled with the second output terminal 023.

Optionally, the voltage converter 026 is configured to output the first voltage to the first output terminal 022 and the source follower 027 in response to the block selection signal and a third voltage loaded to the first power loading terminal 024; the source follower 027 is configured to output the second voltage to the second output terminal 023 in response to the first voltage and a fourth voltage loaded to the second power loading terminal 025.

Optionally, the voltage converter 026 comprises a first phase inverter, a second phase inverter, a first depletion-N-metal oxide semiconductor NDMOS transistor, a second NDMOS transistor and a P-metal oxide semiconductor PMOS transistor; an input terminal of the first phase inverter is coupled with the control terminal 021, an output terminal of the first phase inverter is coupled with an input terminal of the second phase inverter and a gate of the PMOS transistor respectively, an output terminal of the second phase inverter is coupled with an input terminal of the first NDMOS transistor, and an output terminal of the first NDMOS transistor is coupled with a gate of the second NDMOS transistor; an input terminal of the second NDMOS transistor is coupled with the first power loading terminal 024, an output terminal of the second NDMOS transistor is coupled with an input terminal of the PMOS transistor, and an output terminal of the PMOS transistor is connected in parallel with the output terminal of the first NDMOS transistor and then coupled with the first output terminal 022; wherein the first voltage is equal to the third voltage.

Optionally, the fourth voltages loaded to the second power loading terminal 025 in a first operation mode and a second operation mode are different; the first operation mode and the second operation mode are two different ones of a plurality of operation modes of the memory that include a TSG programming mode, a BSG programming mode, a normal programming mode, a preprogramming mode, a read mode, a verify mode and an erase mode.

Optionally, the fourth voltage loaded to the second power loading terminal 025 in any of the TSG programming mode and the BSG programming mode is greater than that loaded in any of the read mode and the verify mode; the fourth voltage loaded to the second power loading terminal 025 in any of the read mode and the verify mode is greater than that loaded in any of the normal programming mode, the preprogramming mode and the erase programming mode.

Optionally, the memory further comprises a power supply circuit 05; the second power loading terminal 025 is coupled with the power supply circuit 05 that is used to load different fourth voltages to the second power loading terminal 025 in the first operation mode and the second operation mode respectively.

In another aspect, a memory is provided, which comprises a first metal oxide semiconductor MOS transistor 06, a second MOS transistor 07, a first driver 03 and a second driver 04; an output terminal of the first MOS transistor 06 is coupled with a control terminal of the first driver 03, and an output terminal of the second MOS transistor 07 is coupled with a control terminal of the second driver 04; the first MOS transistor 06 is configured to load a first voltage to the control terminal of the first driver 03, and the second MOS transistor 07 is configured to load a second voltage to the control terminal of the second driver 04 in order to select target memory cells in a target block within the memory through the first driver 03 and the second driver 04.

Optionally, the first driver 03 comprises a word line WL driver, and the second driver 04 comprises at least one of a top select gate TSG driver and a bottom select gate BSG driver; the first voltage is greater than the second voltage in a normal programming mode of the memory.

Optionally, the memory has a control terminal 021, a first power loading terminal 024 and a second power loading terminal 025; a gate of the first MOS transistor 06 is coupled with the control terminal 021, an input terminal of the first MOS transistor 06 is coupled with the first power loading terminal 024, an output terminal of the first MOS transistor 06 is further coupled with an input terminal of the second MOS transistor 07, and a gate of the second MOS transistor 07 is coupled with the second power loading terminal 025.

Optionally, the first MOS transistor 06 is configured to output the first voltage to the first driver 03 and the second MOS transistor 07 in response to a block selection signal received by the control terminal 021 and a third voltage loaded to the first power loading terminal 024; the second MOS transistor 07 is configured to output the second voltage to the second driver 04 in response to the first voltage and a fourth voltage loaded to the second power loading terminal 025.

Optionally, the first MOS transistor 06 is a P-metal oxide semiconductor PMOS transistor, and the memory further comprises a first phase inverter, a second phase inverter, a first depletion-N-metal oxide semiconductor NDMOS transistor and a second NDMOS transistor; an input terminal of the first phase inverter is coupled with the control terminal 021, an output terminal of the first phase inverter is coupled with an input terminal of the second phase inverter and a gate of the PMOS transistor respectively, an output terminal of the second phase inverter is coupled with an input terminal of the first NDMOS transistor, and an output terminal of the first NDMOS transistor is coupled with a gate of the second NDMOS transistor; an input terminal of the second NDMOS transistor is coupled with the first power loading terminal 024, an output terminal of the second NDMOS transistor is coupled with an input terminal of the PMOS transistor, and an output terminal of the PMOS transistor is coupled with the output terminal of the first NDMOS transistor; wherein the first voltage is equal to the third voltage.

Optionally, the fourth voltages loaded to the second power loading terminal 025 in a first operation mode and a second operation mode are different; the first operation mode and the second operation mode are two different ones of a plurality of operation modes of the memory that include a TSG programming mode, a BSG programming mode, a normal programming mode, a preprogramming mode, a read mode, a verify mode and an erase mode.

Optionally, the fourth voltage loaded to the second power loading terminal 025 in any of the TSG programming mode and the BSG programming mode is greater than that loaded in any of the read mode and the verify mode; the fourth voltage loaded to the second power loading terminal 025 in any of the read mode and the verify mode is greater than that loaded in any of the normal programming mode, the preprogramming mode and the erase programming mode.

In another aspect, a memory is provided, which comprises a first driver 03 and a second driver 04; the first driver 03 is configured to receive a first voltage through a control terminal and receive a fifth voltage through an input terminal, and the second driver 04 is configured to receive a second voltage through a control terminal and receive a sixth voltage through an input terminal in order to select target memory cells in a target block within the memory; wherein a magnitude relationship between the first voltage and the second voltage is the same as that between the fifth voltage and the sixth voltage.

Optionally, the first driver 03 comprises a word line WL driver, and the second driver 04 comprises at least one of a top select gate TSG driver and a bottom select gate BSG driver; the fifth voltage is greater than the sixth voltage, and the first voltage is greater than the second voltage, in a normal programming mode of the memory.

Optionally, the second voltages received by the control terminal of the second driver 04 in a first operation mode and a second operation mode are different; the first operation mode and the second operation mode are two different ones of a plurality of operation modes of the memory that include a TSG programming mode, a BSG programming mode, a normal programming mode, a preprogramming mode, a read mode, a verify mode and an erase mode.

Optionally, the second voltage received by the control terminal of the second driver 04 in any of the TSG programming mode and the BSG programming mode is greater than that received in any of the read mode and the verify mode; the second voltage received by the control terminal of the second driver 04 in any of the read mode and the verify mode is greater than that received in any of the normal programming mode, the preprogramming mode and the erase programming mode.

In another aspect, a storage system is provided, which comprises: the memory of any of the aforementioned aspects; and a controller coupled to the memory and configured to control the memory.

In another aspect, an electronic product is provided, which comprises the aforementioned storage system.

In examples of the present application, a first voltage is loaded by a first output terminal of a voltage loading circuit to a control terminal of a first driver to start the first driver, a second voltage is loaded by a second output terminal of the voltage loading circuit to a control terminal of a second driver to start the second driver, and thus, different starting voltages may be loaded by different output terminals of the voltage loading circuit to different drivers in the memory. That is, all the drivers do not share the same starting voltage any longer; instead, different drivers can use different starting voltages, thereby avoiding performance degradation of some drivers caused by a tunneling effect due to the use of the same starting voltage. Therefore, based on the memory provided by the examples of the present application, the performance degradation of various drivers can be improved.

The above descriptions are only examples of the present application, and the protection scope of the present application is not limited to those. Any variation or replacement readily figured out by those skilled in the art within the technical scope as disclosed by the present application shall fall within the protection scope of the present application. Therefore, the protection scope of the present application shall be subject to the protection scope of the claims.

What is claimed is:

1. A memory comprising:
    a memory array; and
    a periphery circuit coupled to the memory array, the periphery circuit comprising:
        a control circuit;
        a voltage loading circuit, the voltage loading circuit including a control terminal, a first output terminal, a second output terminal, a first power loading terminal, a second power loading terminal, a voltage converter, and a source follower;
        a first driver; and
        a second driver, wherein the voltage loading circuit further includes:
            the control terminal coupled with an output terminal of the control circuit;
            the first output terminal coupled with a control terminal of the first driver;
            the second output terminal coupled with a control terminal of the second driver, wherein the voltage loading circuit is configured to load a first voltage to the control terminal of the first driver through the first output terminal and load a second voltage to the control terminal of the second driver through the second output terminal in order to select target memory cells in a target block within the memory through the first driver and the second driver in response to a block selection signal received by the control terminal;
            a first input terminal of the voltage converter is coupled with the control terminal, a second input terminal of the voltage converter is coupled with the first power loading terminal, and an output terminal of the voltage converter is coupled with the first output terminal; and
            a first input terminal of the source follower is coupled with the output terminal of the voltage converter, a second input terminal of the source follower is coupled with the second power loading terminal, and an output terminal of the source follower is coupled with the second output terminal.

2. The memory of claim 1, wherein the first driver comprises a word line (WL) driver, and the second driver comprises at least one of a top select gate (TSG) driver and a bottom select gate (BSG) driver, and the first voltage is greater than the second voltage in a normal programming mode of the memory.

3. The memory of claim 1, wherein the voltage converter is configured to, in response to the block selection signal and a third voltage loaded to the first power loading terminal, output the first voltage to the first output terminal and the source follower, and wherein the source follower is configured to, in response to the first voltage and a fourth voltage loaded to the second power loading terminal, output the second voltage to the second output terminal.

4. The memory of claim 3, wherein the voltage converter comprises a first phase inverter, a second phase inverter, a first depletion-N-metal oxide semiconductor (NDMOS) transistor, a second NDMOS transistor, and a P-metal oxide semiconductor (PMOS) transistor, wherein the voltage converter further comprises:
    an input terminal of the first phase inverter coupled with the control terminal, an output terminal of the first phase inverter respectively coupled with an input terminal of the second phase inverter and a gate of the PMOS transistor, an output terminal of the second phase inverter coupled with an input terminal of the first NDMOS transistor, and an output terminal of the first NDMOS transistor coupled with a gate of the second NDMOS transistor; and
    an input terminal of the second NDMOS transistor coupled with the first power loading terminal, an output terminal of the second NDMOS transistor coupled with an input terminal of the PMOS transistor, and an output terminal of the PMOS transistor connected in parallel with the output terminal of the first NDMOS transistor and coupled with the first output terminal, and wherein the first voltage is equal to the third voltage.

5. The memory of claim 1, wherein a fourth voltage is loaded to the second power loading terminal in a first operation mode and in a second operation mode, wherein the fourth voltage in the first operation mode is different than the fourth voltage in the second operation mode, and the first operation mode and the second operation mode are two different modes of a plurality of operation modes of the memory that include a top select gate (TSG) programming mode, a bottom select gate (BSG) programming mode, a normal programming mode, a preprogramming mode, a read mode, a verify mode, and an erase programming mode.

6. The memory of claim 5, wherein the fourth voltage loaded to the second power loading terminal in any of the TSG programming mode and the BSG programming mode is greater than the fourth voltage loaded in any of the read mode and the verify mode, and the fourth voltage loaded to the second power loading terminal in any of the read mode and the verify mode is greater than the fourth voltage loaded in any of the normal programming mode, the preprogramming mode, and the erase programming mode.

7. The memory of claim 5, further comprising a power supply circuit, wherein the second power loading terminal is coupled with the power supply circuit, and the power supply circuit is used to load different fourth voltages to the second power loading terminal in the first operation mode and the second operation mode, respectively.

8. A memory device comprising:
a memory array; and
a periphery circuit coupled to the memory array, the periphery circuit comprising:
a first metal oxide semiconductor (MOS) transistor, wherein a gate of the first MOS transistor is coupled with a control terminal of a memory, an input terminal of the first MOS transistor is coupled with a first power loading terminal of the memory;
a second MOS transistor, wherein an output terminal of the first MOS transistor is further coupled with an input terminal of the second MOS transistor, and a gate of the second MOS transistor is coupled with a second power loading terminal of the memory;
a first driver; and
a second driver, wherein the output terminal of the first MOS transistor is coupled with a control terminal of the first driver, and an output terminal of the second MOS transistor is coupled with a control terminal of the second driver,
and wherein the first MOS transistor is configured to load a first voltage to the control terminal of the first driver, and the second MOS transistor is configured to load a second voltage to the control terminal of the second driver in order to select target memory cells in a target block within the memory through the first driver and the second driver.

9. The memory device of claim 8, wherein the first driver comprises a word line (WL) driver, and the second driver comprises at least one of a top select gate (TSG) driver and a bottom select gate (BSG) driver, and wherein the first voltage is greater than the second voltage in a normal programming mode of the memory.

10. The memory device of claim 8, wherein the first MOS transistor is configured to, in response to a block selection signal received by the control terminal and a third voltage loaded to the first power loading terminal, output the first voltage to the first driver and the second MOS transistor, and wherein the second MOS transistor is configured to, in response to the first voltage and a fourth voltage loaded to the second power loading terminal, output the second voltage to the second driver.

11. The memory device of claim 10, wherein the first MOS transistor is a P-metal oxide semiconductor (PMOS) transistor, and the memory further comprises a first phase inverter, a second phase inverter, a first depletion-N-metal oxide semiconductor (NDMOS) transistor, and a second NDMOS transistor, and wherein the memory further comprises:
wherein an input terminal of the first phase inverter is coupled with the control terminal, an output terminal of the first phase inverter is respectively coupled with an input terminal of the second phase inverter and a gate of the PMOS transistor, an output terminal of the second phase inverter is coupled with an input terminal of the first NDMOS transistor, and an output terminal of the first NDMOS transistor is coupled with a gate of the second NDMOS transistor, and
wherein an input terminal of the second NDMOS transistor is coupled with the first power loading terminal, an output terminal of the second NDMOS transistor is coupled with an input terminal of the PMOS transistor, and an output terminal of the PMOS transistor is coupled with the output terminal of the first NDMOS transistor, and wherein the first voltage is equal to the third voltage.

12. The memory device of claim 8, wherein a fourth voltage is loaded to the second power loading terminal in a first operation mode and in a second operation mode, wherein the fourth voltage of the first operation mode is different than the fourth voltage of the second operation mode, and wherein the first operation mode and the second operation mode are two different modes of a plurality of operation modes of the memory that include a top select gate (TSG) programming mode, a bottom select gate (BSG) programming mode, a normal programming mode, a preprogramming mode, a read mode, a verify mode and an erase programming mode.

13. The memory device of claim 12, wherein the fourth voltage loaded to the second power loading terminal in any of the TSG programming mode and the BSG programming mode is greater than the fourth voltage loaded in any of the read mode and the verify mode, and wherein the fourth voltage loaded to the second power loading terminal in any of the read mode and the verify mode is greater than the fourth voltage loaded in any of the normal programming mode, the preprogramming mode, and the erase programming mode.

14. A memory comprising:
a memory array; and
a periphery circuit coupled to the memory array, the periphery circuit comprising:
a first driver configured to receive a first voltage through a first control terminal and receive a fifth voltage through a first input terminal; and
a second driver configured to receive a second voltage through a second control terminal and receive a sixth voltage through a second input terminal in order to select target memory cells in a target block within a memory, wherein a magnitude relationship between the first voltage and the second voltage is the same as that between the fifth voltage and the sixth voltage, wherein the second voltage in a first operation mode is different than the second voltage in a second operation mode, wherein the first operation mode and the second operation mode are two different modes of a plurality of operation modes of the memory that include a top select gate (TSG) programming mode, a bottom select gate (BSG) programming mode, a normal programming mode, a preprogramming mode, a read mode, a verify mode, and an erase programming mode, wherein the second voltage received in the TSG programming mode and the BSG programming mode is greater than the second voltage received in any of the read mode and the verify mode, and wherein the second voltage received in any of the read mode and the verify mode is greater than the second voltage received in any of the normal programming mode, the preprogramming mode, and the erase programming mode.

15. The memory of claim 14, wherein the first driver comprises a word line (WL) driver, and the second driver comprises at least one of a TSG driver and a BSG driver, and wherein the fifth voltage is greater than the sixth voltage and the first voltage is greater than the second voltage in the normal programming mode of the memory.

* * * * *